United States Patent [19]

Fine

[11] 3,889,827

[45] June 17, 1975

[54] TRUCK LOADING AND UNLOADING APPARATUS

[76] Inventor: Boyce Fine, 3720 E. Archer, Tulsa, Okla. 74115

[22] Filed: July 23, 1973

[21] Appl. No.: 381,726

Related U.S. Application Data

[63] Continuation-in-part of Ser. No. 160,056, July 6, 1971, abandoned.

[52] U.S. Cl. ............... 214/77 P; 214/77 R; 214/85; 214/505; 296/61
[51] Int. Cl. .............................................. B60p 1/44
[58] Field of Search ............ 214/77 P, 77 R, 78, 80, 214/85, 505, 506; 296/57, 61

[56] References Cited
UNITED STATES PATENTS

| 2,739,719 | 3/1956 | Mackaness et al. | 214/77 R |
| 2,781,924 | 2/1957 | Hughes | 214/77 R |
| 2,789,707 | 4/1957 | Wolf | 214/77 R |
| 3,118,551 | 1/1964 | Stewart | 214/77 R |
| 3,352,440 | 11/1967 | Wilson | 214/85 |

FOREIGN PATENTS OR APPLICATIONS

| 597,209 | 8/1925 | France | 214/77 R |
| 911,653 | 11/1962 | United Kingdom | 214/77 R |
| 142,449 | 7/1951 | Australia | 214/77 R |
| 121,302 | 3/1948 | Sweden | 214/77 R |

*Primary Examiner*—Albert J. Makay
*Assistant Examiner*—L. J. Paperner

[57] ABSTRACT

An apparatus for loading and unloading articles into truckbeds wherein a foldable loading structure is pivotally mounted along the edge of the truckbed and which will serve as a ramp means when unfolded, the said ramp means being raised and lowered in an angular movement by hydraulic means engagable therewith. Guide means is provided in conjunction with the hydraulic means for guiding the said hydraulic means along a path so that it will constantly be in a position to receive and engage the ramp means. A second embodiment employs guide means for maintaining the hydraulic means in a longitudinal disposition.

8 Claims, 5 Drawing Figures

3,889,827

TRUCK LOADING AND UNLOADING APPARATUS

CROSS REFERENCE

This application is a continuation-in-part of now abandoned application Ser. No. 160,056, filed July 6, 1971, and entitled: TRUCK FOLDING AND UNLOADING APPARATUS.

BACKGROUND OF THE INVENTION

1. Field of the Invention

This invention relates to improvements to an apparatus to facilitate loading and unloading of goods from trucks and more particularly, but not by way of limitation, to a foldable tailgate means for a pickup truck which may be unfolded to form a ramp, said ramp being raised and lowered by hydraulic means.

2. Description of the Prior Art

The loading and unloading of heavy bulky goods such as domestic appliances including electric ranges, refrigerators, washing machines and the like have created perennial problems for businessmen. In many instances, two men are needed to manually lift the goods onto and from the truck. This practice puts the men in a position susceptible to physical injury and requires the businessmen to employ two deliverymen when often one man could handle the job if it were not for the loading and unloading of the goods onto and off the truck.

Vertical lift devices have been perfected for trucks but are normally prohibitively expensive for use on small pickup delivery trucks. Devices such as found in U.S. Pat. No. 3,155,258 have attempted to alleviate the problem but require special dollies and equipment.

SUMMARY OF THE INVENTION

Generally, this invention provides a foldable, loading structure pivotally mounted at the edge of a truckbed which permits safe one-man handling of bulky goods onto and from a truckbed. This apparatus generally comprises a foldable tailgate member which may be extended to form a planar surface or ramp extending from the edge of the truckbed to the ground. The rear or underside of the tailgate is provided with a bracket member. A linear actuated hydraulic means is secured beneath the truckbed and is provided with an aperture for receiving the tailgate bracket therein. The aperture in one embodiment is provided with an arcuate cam follower and a guide means whereby the said aperture will be guided by the cam follower along a path so that it will always be in a position to receive the tailgate bracket regardless of the angular position of the said tailgate. A second embodiment provides guide means for maintaining the aperture in longitudinal orientations.

For loading goods the operator swings the loading structure down to form a planar surface extending from the edge of the truckbed to the ground or loading dock which may be beneath the plane formed by the truckbed. A handling cart or dolly with the goods to be loaded thereon is then wheeled onto the ramp structure. A hydraulic device is then actuated by the operator which raises the loading structure until the ramp is coplanar with the truckbed. The dolly can then be easily rolled onto the bed into a suitable position. The loading ramp may then be folded up and utilized as a standard tailgate and the hydraulic device may then be retracted. Unloading is accomplished by similar steps performed in a reverse sequence. Since the support structure which is secured to the hydraulic device of the first embodiment is particularly designed to be guided along a path that is coincident with the path followed by the tailgate support bracket, the said support aperture will always be in a position to receive the tailgate support bracket regardless of the position of the hydraulic device and will therefore require no manual attachment thereof by the operator.

The present truck loading and unloading ramp apparatus is particularly designed to provide an inexpensive means for enabling one man to load and unload bulky goods from delivery trucks, the said ramp apparatus being easily installable on existing motor trucks with a minimum of modification to the said truck.

BRIEF DESCRIPTION OF THE DRAWINGS

Other and further advantageous features of the present invention will hereinafter more fully appear in connection with a detailed description of the drawings in which.

DETAILED DESCRIPTION

Figure 1:
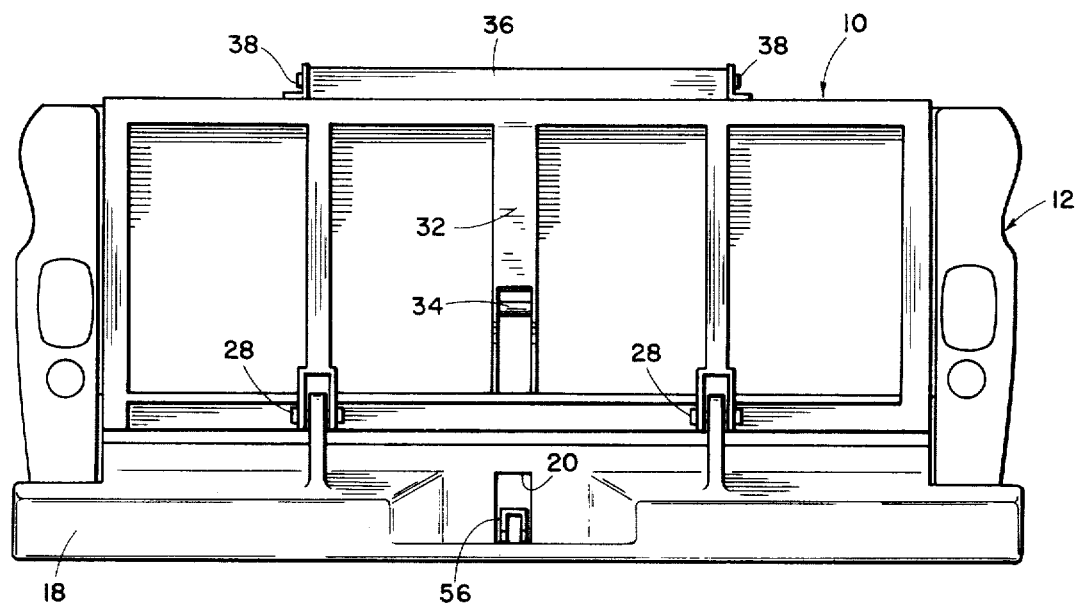
FIG. 1 is a rear elevational view of a truckbed having a loading and unloading ramp apparatus depicting the first embodiment, said ramp being folded into place.
Figure 2:
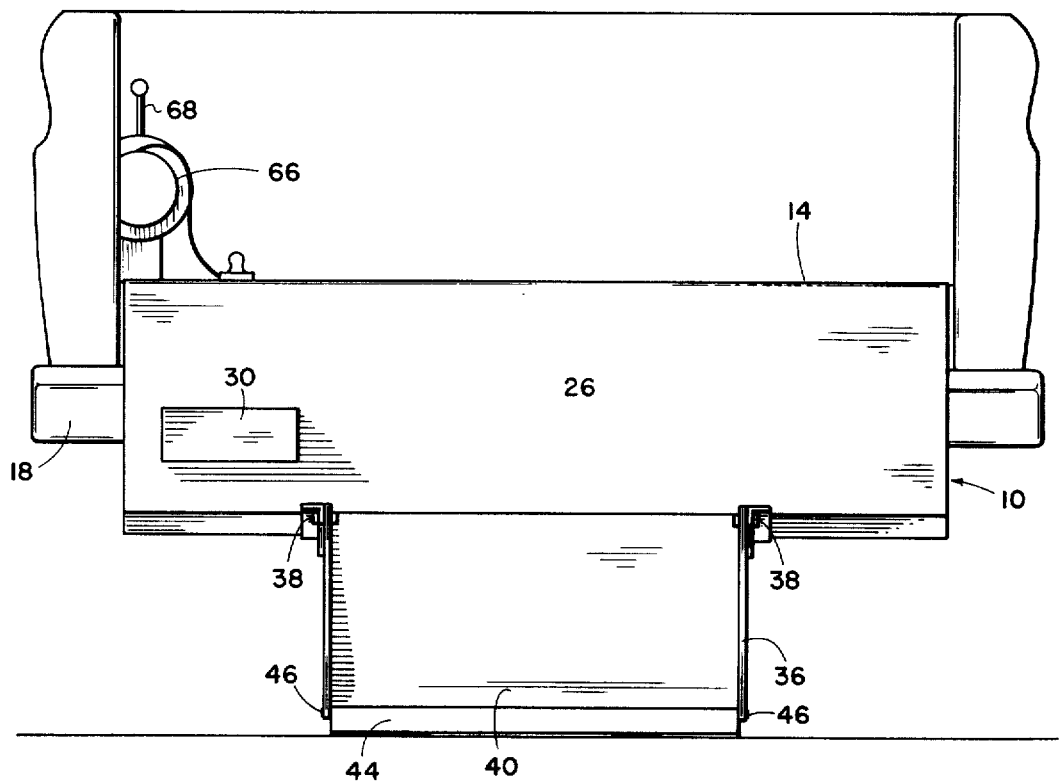
FIG. 2 is a rear elevational view of the truckbed of FIG. 1 with the said ramp unfolded and lowered into position for receiving goods thereon.
Figure 3:
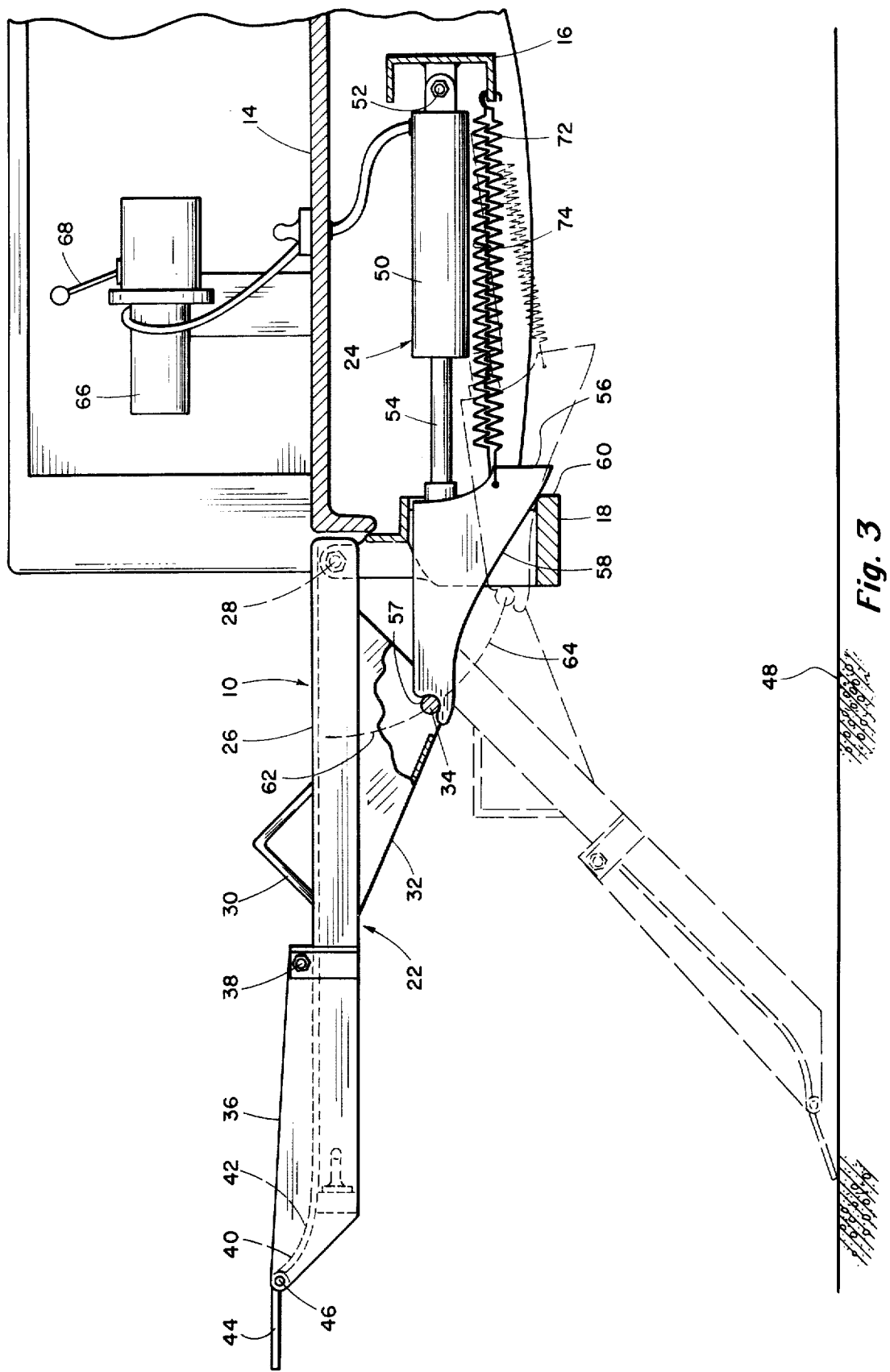
FIG. 3 is a side elevational view of the loading and unloading ramp apparatus of FIGS. 1 and 2 depicting various positions of use for the said ramp apparatus.

Referring to the drawings in detail, and in particular to FIGS. 1, 2 and 3, reference character 10 generally indicates a truck loading and unloading ramp apparatus which is installed on a truck box generally indicated by reference character 12 having a truckbed 14 thereon. Frame members are normally provided beneath the truckbed 14 and for purposes of description herein generally indicated by reference character 16. Most pickup trucks are also provided with traversely extending steel bumpers which are attached along the rear edge of the truckbed and extend downwardly therefrom. The bumper member 18 is provided with a centrally disposed rectangular opening 20 therethrough for a purpose that will be hereinafter set forth.

The ramp apparatus generally comprises a foldable ramp means 22 which is pivotally secured along the rear edge of the truckbed 14 and a hydraulic means generally indicated by reference character 24 which is pivotally secured to the truck undercarriage 16 and is operably engagable with the ramp means 22.

The ramp means 22 essentially comprises two sections, the first section thereof hereinafter referred to as the tailgate section 26 is preferably of a size equivalent to that of the ordinary pickup tailgate and may be constructed from an existing tailgate.

The tailgate section 26 is pivotally secured along one edge thereof to the lower edge of the truckbed 14 about the pivot points 28 and which allow pivoting thereof from a vertical position as shown in FIG. 1 to a lowered ramp position as shown in FIG. 2. The upper or front face of the tailgate section 26 is provided with a step means 30 on one side thereof which may be constructed of a simple angle arm and disposed such that one surface thereof will be essentially flat when the ramp means 22 is in its lowermost position as shown in the dashed lines of FIG. 3. The opposite side of the tailgate section 26 is provided with a rearwardly extending bracket 32 having a centrally disposed traversely oriented pin member 34 secured thereto.

The second section or foldout section 36 of the ramp means 22 is pivotally secured to the said ramp along the free edge of the tailgate section 26 by suitable pivot pins 38, the said foldout section 36 normally being of a width less than the width of the tailgate section 26 but not necessarily so. The tailgate of the foldout section 36 may be folded against the front or upper surface of the tailgate section 26 as depicted by the dashed lines of FIG. 3 or may be rotated through 180° to a position which is coplanar with the tailgate section 26, thereby essentially forming an extension thereof. The outer or free edge of the foldout section 36 is provided with an upwardly extending lip member 40 which thereby creates a traversely extending furrow 42 along the upper free edge thereof when the said foldout section 36 is folded to be coplanar with the tailgate section 26.

A flat plate 44 may be pivotally secured along the upper or outer edge of the lip member 40 by means of a suitable pivot pin 46, said flat plate 44 being contactable with the ground level as generally indicated by reference character 48 to allow smooth loading and unloading of wheeled vehicles such as dollies and the like (not shown) into and out of the furrow 42 when the ramp means 22 is in its forwardmost position as shown in FIG. 2 and the dashed lines of FIG. 3.

The hydraulic means 24 generally comprises a hydraulic cylinder 50 which is pivotally connected at the forward end thereof to the vehicle undercarriage 16 by means of a suitable pivot pin 52. The piston member (not shown) is provided with a rearwardly extending piston rod 54 extending outwardly therefrom. The rearward end of the piston rod 54 is provided with a bracket attachment means 56, the cross sectional shape of the bracket attachment means 56 being rectangular and suitable for reciprocal movement through the rectangular opening 20 of the bumper member 18. The vertical sides of the bracket attachment member 56 is in general conformity with the vertical size of the rectangular aperture 20 which serve to prevent the said bracket attachment member 56 from rotating about the axis of the piston rod 54.

The lower surface of the bracket attachment member 56 is of a concave arcuate shape and when being reciprocated through the rectangular aperture 20 of the bumper 18, the said surface 58 rides on the lower plate 60 which forms a bottom surface of the said rectangular aperture 20 of the bumper member 18.

Referring now to FIG. 3 the dashed lines 62 indicate the path of the pin member 34 of the bracket 32 which is attached to the tailgate section 26 as hereinbefore described. The arcuate shape surface 58 of the bracket attachment member 56 is shaped in a manner such that as the piston rod 54 is fully extended, thereby fully extending the bracket member 56, the aperture 57 thereof will follow an arcuate path 64 which is concident with the arcuate path 62 of the pin member 34.

Therefore, it is obvious that regardless of the position of the ramp means 22 from that of being coplanar with the truckbed 14 to its lowermost position as shown by the dashed lines of FIG. 3, that when the bracket attachment member 56 is extended to make contact with the said ramp means the aperture 57 thereof always contacts the bracket pin member 34, the said pin member 34 coming to rest therein.

The hydraulic cylinder 50 is operably connected to a suitable hydraulic motor and reservoir means 66 which may be located on the truckbed 14 on the same side as the step member 30. The motor and reservoir means 66 may be provided with a simple operation handle 68 and is operably connected to the cylinder 50 by means of a suitable hydraulic line 70. The hydraulic means 24 may be provided with a pair of oppositely disposed tension springs 72 and 74 which are connected between the vehicle undercarriage 16 and the bracket attach member 56 so that when hydraulic pressure is removed from the cylinder 50, the said bracket attachment member 56 will be slowly retracted to position as shown in FIG. 1 and the dashed lines of FIG. 3.

OPERATION

When it is desired to utilize a dolly or the like to load goods onto the pickup bed, the operator may lower the tailgate section 26 and unfold the foldout section 36 to form the elongated ramp means 22. The ramp means 22 may then be lowered to its lowermost position so that the flat plate 44 engages the ground 48. It will be noted that on a flat surface the bracket pin 34 of the tailgate section 26 will come to rest in the aperture 57 of the bracket attachment member 56 as shown by the dashed lines of FIG. 3. A dolly with goods loaded thereon may then be wheeled onto the foldout section 36 with the wheels of the said dolly coming to rest in the furrow 42 thereof. The operator may then step one foot onto the step member 30 and reach with one hand to the operator handle 68 of the hydraulic motor and reservoir means 66. By operating the handle 68 hydraulic pressure is applied to the cylinder 50 thereby extending the piston rod 54 and its associated bracket attach means 68 thereby raising the ramp means 22 to a horizontal position or to a position which is coplanar with the truckbed 14. So long as hydraulic pressure is maintained at the piston 50 the ramp will remain in this position and the dolly may then be easily wheeled onto the truckbed 14 and the goods unloaded therefrom. Foldout section 36 may then be folded into place against the tailgate section 26 and the entire assembly then raised into position to form an ordinary pickup tailgate as shown in FIG. 1 and the dashed lines of FIG. 3. Upon releasing the hydraulic pressure from the cylinder 50 the springs 72 and 74 will then cause the bracket attach member 56 to retract to its fully retracted position which is substantially flush with the rear edge of the bumper 18.

In order to unload goods from the vehicle, the hydraulic motor may be operated to fully extend the bracket attach member 56 and the ramp means 22 then fully unfolded to its horizontal position or position coplanar with the truckbed 14. It is noted that the unfolding operation may be accomplished before the bracket attachment member is extended since regardless of the position thereof the aperture 57 of the bracket attachment member 56 will make contact with the bracket pin 34 and upon extension of the bracket attach member 56 the said ramp means 22 will assume a position which is coplanar with the truckbed 14. The dolly with goods carried thereon may then be rolled out onto the ramp means 22 so that the wheels of the dolly are positioned within the furrow 42 of the foldout member 36. The operator then by placing one foot on the step means 30 and operating the hydraulic motor and reservoir handle 68 with one hand may then relieve pressure from the hydraulic cylinder 50, causing the bracket attachment member 56 to be retracted, thereby lowering the ramp 22 to its lowermost position whereby the dolly may then be rolled off the ramp.

From the foregoing, it is obvious that with very little practice by an operator a single operator will be able to utilize this invention to perform tasks heretofore requiring two deliverymen and thereby greatly reducing chance of physical injury caused by lifting goods to and from a pickup bed. It is also obvious that the present invention provides a means which is economical and durable in construction and yet simple and efficient in operation.

Figure 4:
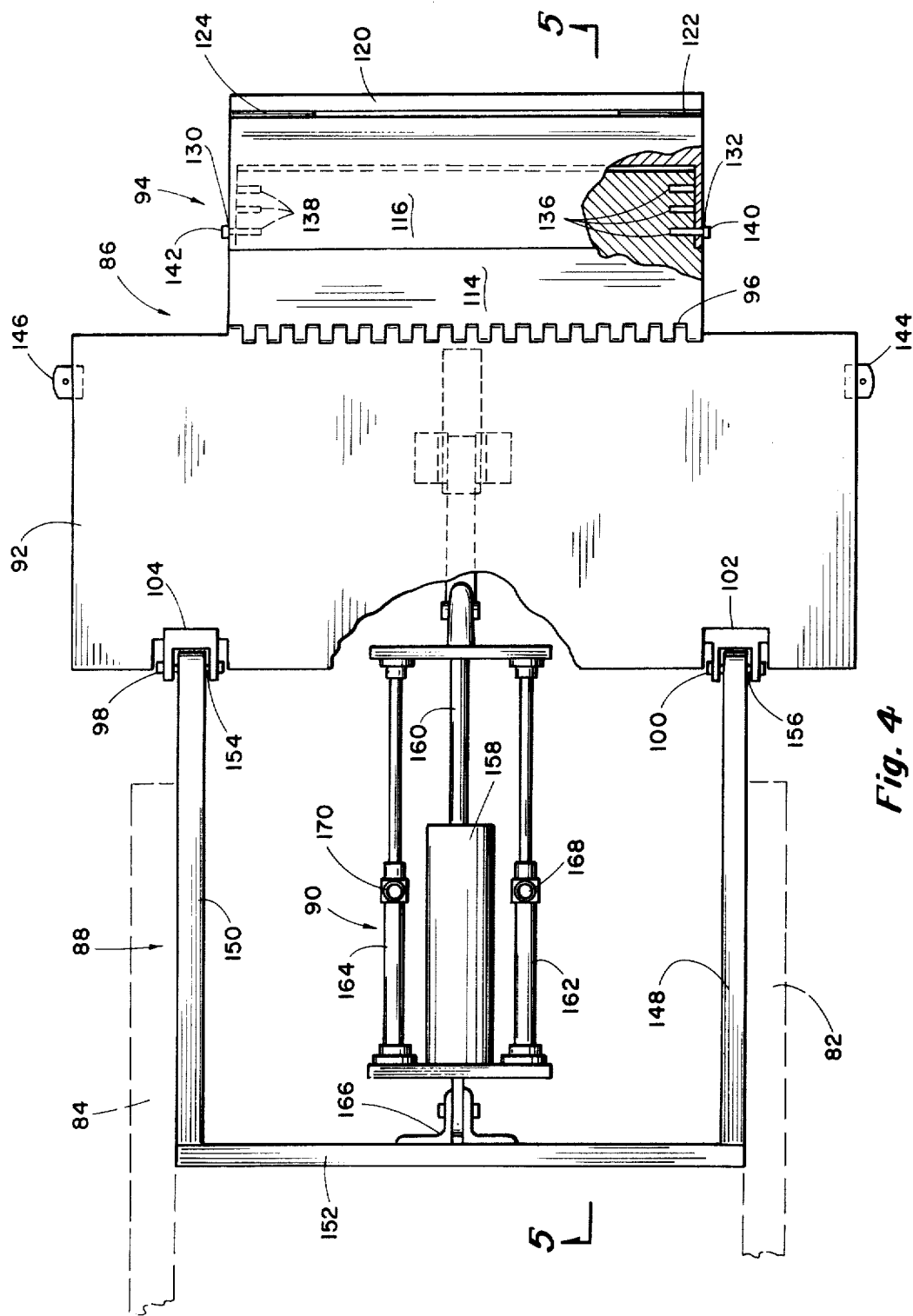
FIG. 4 is a plan view of the apparatus depicting the second embodiment.
Figure 5:
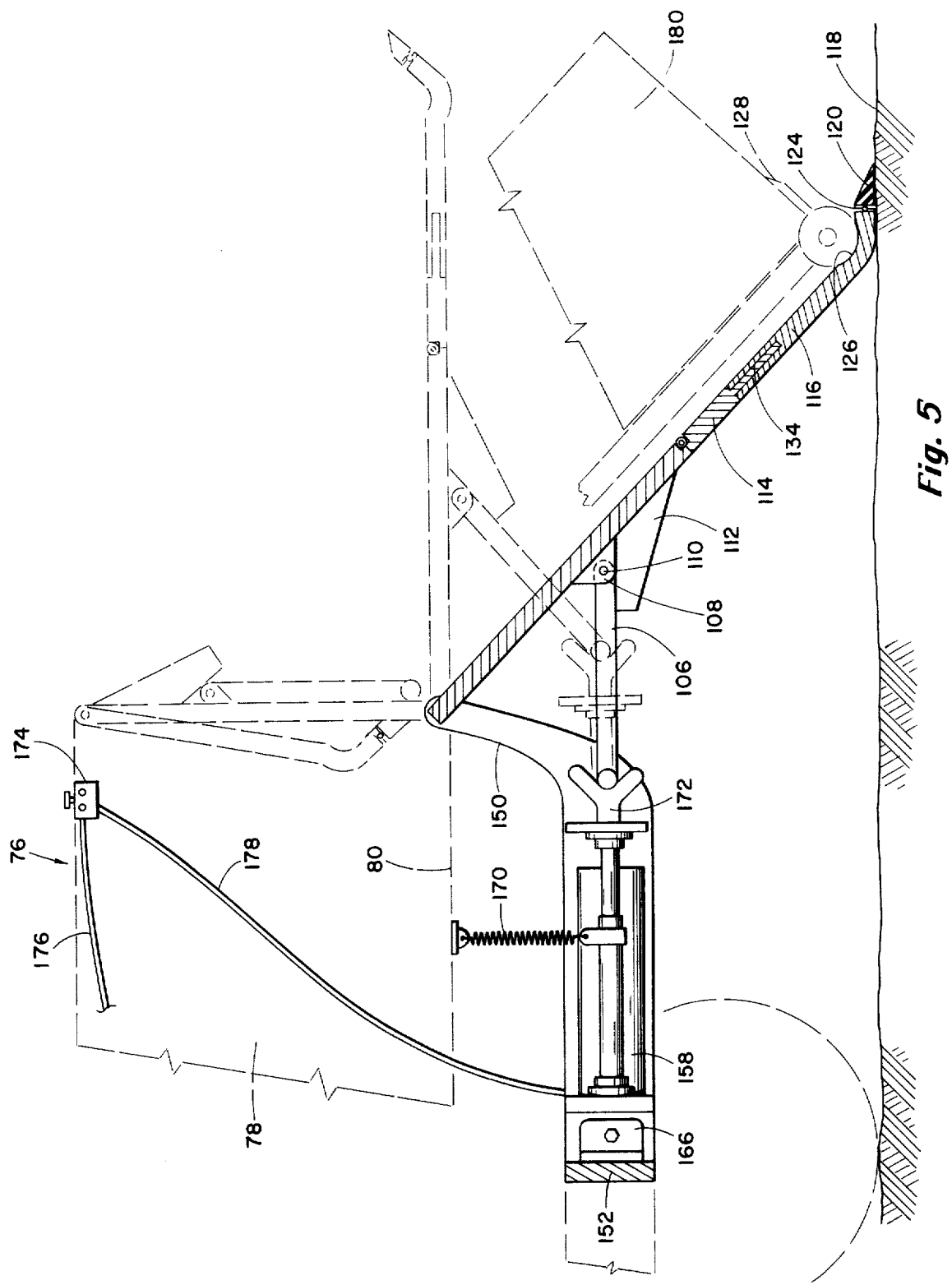
FIG. 5 is a cross sectional view taken along the broken line 5—5 of FIG. 4.

In describing the second embodiment of this invention illustrated in FIGS. 4 and 5 in the drawings, specific terminology will be used for the sake of clarity. However, it is not intended that this language should limit the invention and it is to be understood that each specific term used includes all technical equivalents which operate in a similar manner to accomplish a similar purpose.

Referring to the figures reference character 76 denotes generally a conventional truck having a truck box 78 with a bed 80 and undercarriage 82 and 84. Reference character 86 designates a loading structure pivotally mounted to supporting frame 88. A fluid pressure actuated means 90 is mounted to the frame 88 on one end and is interconnected to loading structure 86 on its opposite end.

Loading structure 86 incorporates two main sections, 92 and 94 connected to each other by hinge 96 so fabricated so as to allow up to but no more than 180° pivoting of section 94 in respect to 92. Section 92 is a rectangular sheet composed of material such as steel pivoted to frame 88 by pins 98 and 100 protruding through apertures in hinges 102 and 104. A connecting rod 108 is vertiginously fastened to the underside of section 92 by means of bracket 108 and pin 110.

Section 94 is divided into components 114 and 116 to provide compensating means for differentials in the distance between the bed 80 and the ground 118 or equivalent loading surface. An inclined planar extension 120, composed of material similar to hard rubber is attached to the opposite edge of subsection 116 by hinges 122 and 124 in a manner commonly known in the art. In its area adjacent to extension 120 subsection 116 is curved so as to be in a plane parallel to the ground 118 when the loading structure 86 is in the lowered position. On the loading side of the subsection 116 in the same said area, a rounded furrow 126, running the width of the subsection, prevents movement of a handling cart 128 during operation of the loading structure 86. Apertures 130 and 132 are cut into each side of subsection 116. An extension segment 134 of subsection 114 is slidably disposed in the before mentioned groove of subsection 116. A plurality of apertures 136 and 138 are cut into the sides of extension segment 134 and are selectively aligned with apertures 130 and 132. Said subsections 114 and 116 are joined and secured by fasteners 140 and 142 placed through the aligned apertures 130–136 and 132–138. Latching means 144 and 146 similar to those known in the art are provided for locking the loading structure 1 during transit.

Supporting frame 88 is constructed of two parallel members 148 and 150, made from material such as iron joined to the truck's undercarriage 82 and 84 by means such as welding and connected to each other at their forward ends by perpendicular cross member 152. The ends of the parallel members 148 and 150 opposite to cross member 152 are curved upwardly to extend to and end at the edge of the bed 80 of the truck box 178. Apertures 154 and 156 accept pins 98 and 100 thereby pivotally attaching section 92 to frame 88 and providing a horizontal axis for rotation of loading structure 86.

Fluid pressure actuated means 90 incorporates a hydraulic cylinder 158 with a movable piston 160 and sleeves 162 and 164 in a manner commonly known in the art. Fluid pressure actuated means 90 is pivotally mounted to cross member 152 by bracket and pin arrangement 166, as is common in the art. Springs 168 and 170 provide a connecting linkage between fluid pressure actuated means 90 and the bed 80 of truck box 78. A yoke 172 is attached to the movable piston 160 of the hydraulic cylinder 158. The piston 160 extends from and retracts into hydraulic cylinder 158 on command from a control station 174 mounted on the truck box 78. Control station 174 is connected to a pump motor (not shown) by hydraulic hosing 176 and to hydraulic cylinder 158 by hydraulic hosing 178.

In operation, a delivery man unlatches the loading structure 86 from the truck box 78 by disengaging latching means 144 and 146. He then swings loading structure 86 downward until rod 106 which during the lowering of loading structure 86 has angularly moved down to rest on block 112, engages yoke 172 of the fluid pressure actuated means 90. Springs 162 and 164 allow the fluid pressure actuated means 90 to move upward or downward enabling the weight of loading structure 86 to lodge the connecting rod 106 in the cradle of yoke 172. The delivery man then pivots section 94 180° in respect to section 92, whereupon loading structure 86 extends from the edge of the bed 80 to the ground 118. A material handling cart 128, with goods 180 thereon, is then wheeled onto loading structure 86 over the wedge-like extension 120, its wheels becoming disposed in furrow 126. The delivery man by means of control station 174 then actuates the movable piston 160 into an extending movement thereby causing the loading structure via the connecting rod 106 and yoke 172 to pivot upwardly in an arc until the loading structure 86 is in the same horizontal plane as the bed 80. The delivery man then wheels the material handling cart 128 from the loading structure 86 onto the bed 80. After the goods 180 have been loaded, the delivery man pivots section 94 until it rests on section 92, he then proceeds to swing loading structure 86 upwardly to form a plane perpendicular to the bed 80 and to lock it in this plane by the use of latching means 144 and 146. Finally the delivery man retracts the movable piston 160 to its original position by the use of control station 174. For unloading, the identical steps used in loading are performed up to and including the raising of loading structure 86 to the same horizontal plane as the bed 80. At this point the material handling cart 128 with the goods 180 loaded thereon is manually wheeled from the bed 80 onto loading structure 86. The control station 174 is then made to send a signal which produces a retractive movement of piston 160; thereby causing, via the linkage of connecting rod 106 and yoke 172, the loading structure 86 to rotate downward until it extends from the edge of the bed 80 to the ground 118. The material handling cart 128 with goods 180 loaded thereon is wheeled from the loading structure 86. Section 94 is then pivoted until it rests on section 92, thereupon the loading structure 86 is then swung upward to form a plane perpendicular to the bed 80 and locked in said plane by means of latching means 144 and 146.

From the foregoing description it can be seen that the invention presents a safe means for one-man loading and unloading of merchandise which is especially adapted for use in conjunction with commercial vehicles particularly pickups without incurring major expensive modification to said pickup.

Whereas the present invention has been described with particular relation attached hereto other and further modifications apart from those shown or suggested herein may be made within the spirit and scope of this invention.

What is claimed is:

1. In a truck, having a truck bed thereon, and a tailgate section pivotally attached along one edge thereof to one edge of the truck bed, a loading ramp apparatus comprising a ramp section having one edge thereof pivotally secured along the free edge of the tailgate section, said ramp section being foldable against the tailgate section and being free to rotate 180° for extending the length of the tailgate section whereby in its lowest position said tailgate section and ramp section form an inclined ramp structure from the truck bed to the ground; bracket means secured to the outer surface of the tailgate section; movable ramp support means comprising a fluid operated cylinder having one end thereof pivotally secured beneath the truck bed, an elongated piston rod reciprocally disposed within the cylinder and having one end thereof extending outwardly from the opposite end of the cylinder, bracket support means secured to the outer end of the piston rod and said bracket support means being separate from the bracket means and engagable therewith when the tailgate section is between a substantially horizontal position and its lowest position, guide means carried by the truck bed operably connected to the bracket support means, said guide means being capable of guiding the bracket support means along a path which coincides with the path of the bracket means when the tailgate section is pivoted with respect to the truck bed.

2. A loading ramp apparatus as set forth in claim 1 wherein one surface of the ramp section is provided with a furrow along the free edge thereof for receiving the wheels of loading equipment therein when the said ramp section is extended.

3. A loading ramp apparatus as set forth in claim 2 wherein an elongated flat plate is pivotally secured along one edge thereof to the free edge of the ramp section adjacent to the furrow for providing a sub ramp from the ground to the furrow for facilitating moving loading equipment wheels thereacross when the inclined ramp structure is in its lowest most position.

4. In a truck having a truckbed thereon and a tailgate section pivotally attached along one edge thereof to one edge of the truckbed, a loading ramp apparatus comprising a ramp section having one edge thereof pivotally secured along the free edge of the tailgate section, said ramp section being foldable against the tailgate section and being free to rotate 180° for extending the length of the said tailgate section whereby in its lowest position said tailgate section and ramp section form an inclined ramp structure from the truckbed to the ground; bracket means secured to the outer surface of the tailgate section; movable ramp support means pivotally secured to the truck beneath the truckbed, said support means having a bracket support aperture means which is engagable with the bracket means for supporting said ramp structure between its lowest position and the position wherein the said ramp structure is co-planar with the truck bed and wherein said bracket means extends outwardly from the truck when the tailgate section is in its folded position; and wherein the support means comprises a fluid operated cylinder pivotally secured beneath the truckbed, an elongated piston rod reciprocally disposed within the cylinder having one end thereof extending outwardly therefrom, the aperture means comprising an aperture for engaging and supporting the bracket means, arcuate cam surface disposed adjacent to the aperture, cam follower means secured to the truck and disposed in sliding engagement with the cam surface whereby upon extending and retracting the piston rod, the aperture is guided by the cam surface and cam follower means along a curved path which coincides with the path of the bracket means when the tailgate section having the bracket means attached thereto is pivoted with respect to the truckbed.

5. A loading ramp apparatus as set forth in claim 4 wherein the fluid operated cylinder is a hydraulic cylinder and also comprises hydraulic operator controls secured to the truck adjacent to the ramp structure, said controls being hand operable and operably connected to the fluid cylinder.

6. A loading ramp apparatus as set forth in claim 5 wherein guide means is secured to the truck and disposed in engagement with the aperture means for preventing said aperture means from rotating about the reciprocating axis of the piston rod and to prevent lateral movement thereof.

7. A loading ramp apparatus as set forth in claim 6 wherein the truck is provided with a bumper and the cam follower and guide means comprises a rectangular shaped opening in the truck bumper, the sidewalls of the opening serving as the guide means and the bottom surface thereof serving as the cam follower.

8. In a pickup type truck having a bed and original equipment sidewalls surrounding said bed, a first tailgate section pivotal along one edge of said bed from a first position forming all or a portion of one of said sidewalls and of height substantially the same as said sidewalls to a second position extending downwardly and outwardly of said bed, the improvement being an apparatus for loading and unloading articles carried by a two-wheeled dolly from the ground onto said bed comprising:

a second planar section pivotally attached to the other edge of said tailgate section and of length no greater than the height of said tailgate section, to fold, in said first position of said tailgate section, downwardly and inwardly of said bed, and to form in said second position of said tailgate section a rigid extension thereof to the ground, said second section further having adjacent its outer edge a horizontal furrow whereby when in said second position to receive and retain the wheels of said dolly when in said second position; said second planar section including:

a first subsection having a forward end hinged to said first planar section and further having a rearwardly extending portion; a second subsection having a forward edge possessing an elongated groove slot in which is longitudinally slidably disposed between selective positions said rearwardly extending portion whereby the length of said second planar section can be adjusted; said second subsection having a pair of apertures and said first subsection having a plurality of paired spaced apart apertures, one pair of which is in registered alignment with said apertures on said second subsection in each of said selective positions, and fastening means insertable in said aligned apertures for retaining said subsection in a selected position; and means operable against the underside of said first tailgate section to pivot said first tailgate section and said second section through an arc from between said second position to a horizontal position coplanar with said bed.

* * * * *